(12) United States Patent
Shuster (10) Patent No.: US 7,428,576 B2
(45) Date of Patent: Sep. 23, 2008

(54) ADDRESSEE-DEFINED MAIL ADDRESSING SYSTEM AND METHOD

(75) Inventor: Brian Mark Shuster, Stateline, NV (US)

(73) Assignee: Hoshiko LLC, Henderson, NV (US)

( * ) Notice: Subject to any disclaimer, the term of this patent is extended or adjusted under 35 U.S.C. 154(b) by 609 days.

(21) Appl. No.: 09/860,052

(22) Filed: May 16, 2001

(65) Prior Publication Data

US 2002/0023135 A1 Feb. 21, 2002

Related U.S. Application Data

(60) Provisional application No. 60/204,723, filed on May 16, 2000.

(51) Int. Cl.
*G06F 15/16* (2006.01)
(52) U.S. Cl. ........................ 709/206; 709/238; 709/245; 713/162
(58) Field of Classification Search ......... 709/202–206, 709/228
See application file for complete search history.

(56) References Cited

U.S. PATENT DOCUMENTS

| | | | |
|---|---|---|---|
| 5,822,526 A | 10/1998 | Waskiewicz | |
| 5,826,022 A | 10/1998 | Nielsen | |
| 5,930,479 A * | 7/1999 | Hall | ............................ 709/238 |
| 5,956,486 A | 9/1999 | Hickman et al. | |
| 5,999,932 A | 12/1999 | Paul | |
| 6,023,723 A | 2/2000 | McCormick et al. | |
| 6,052,709 A | 4/2000 | Paul | |
| 6,112,227 A | 8/2000 | Heiner | |
| 6,161,130 A * | 12/2000 | Horvitz et al. | .............. 709/206 |
| 6,192,114 B1 | 2/2001 | Council | |
| 6,212,553 B1 * | 4/2001 | Lee et al. | ..................... 709/206 |
| 6,266,692 B1 * | 7/2001 | Greenstein | ................... 709/206 |
| 6,301,608 B1 * | 10/2001 | Rochkind | .................... 709/206 |
| 6,351,764 B1 * | 2/2002 | Voticky et al. | .............. 709/207 |
| 6,487,584 B1 * | 11/2002 | Bunney | ....................... 709/206 |
| 6,496,853 B1 * | 12/2002 | Klein | ......................... 709/206 |
| 6,591,291 B1 * | 7/2003 | Gabber et al. | ............... 709/206 |
| 6,829,631 B1 * | 12/2004 | Forman et al. | .............. 709/202 |
| 6,868,436 B1 * | 3/2005 | Fleming, III | ................ 709/206 |
| 2002/0087641 A1 * | 7/2002 | Levosky | ...................... 709/206 |
| 2003/0200267 A1 * | 10/2003 | Garrigues | ................... 709/206 |

OTHER PUBLICATIONS

Crocker, David, "Standard for the Format of ARPA Internet Text Messages", Department of Electrical Engineering, University of Delaware, Aug. 1982, pp. 1-50.
Postal, Jonathan, "Simple Mail Transfer Protocol", Information Science Institute, University of Southern California, Aug. 1982, pp. 1-70.
Partridge, Craig, "Mail Routing and the Domain System", CSNET CLC BRN Laboratories, Inc., Jan. 1986, pp. 1-7.

* cited by examiner

*Primary Examiner*—F. Zeender
*Assistant Examiner*—Ramsey Refai
(74) *Attorney, Agent, or Firm*—Connolly Bove Lodge & Hutz LLP; Jonathan A. Jaech (57) ABSTRACT

A mail delivery system and method utilize unique delivery addresses, each for a corresponding addressee, and addressee-controlled delivery codes. Each delivery code is embedded in a message address but is distinct from the unique root delivery address for the addressee. Mail that bears an address that includes an embedded valid delivery code is delivered and optionally sorted according to the code. Mail that lacks an embedded delivery code is segregated as lacking a valid code. Addressees of the system may define any number of delivery codes and may invalidate delivery codes as desired.

20 Claims, 3 Drawing Sheets

ADDRESSEE-DEFINED MAIL ADDRESSING SYSTEM AND METHOD

CROSS-REFERENCE TO RELATED APPLICATION

This application claims priority pursuant to 35 U.S.C. §119(e) to U.S. Provisional Application Ser. No. 60/204,723, filed May 16, 2000, which application is specifically incorporated herein, in its entirety, by reference.

BACKGROUND OF THE INVENTION

1. Field of the Invention

The present invention relates to systems and methods for delivering and receiving mail, particularly electronic messages, such as electronic mail (email) and voice mail as used in electronic messaging on communications networks. More particularly, the invention relates to an addressee-defined addressing system and method for creating and using mail addresses in a mail system.

2. Description of Related Art

Postal services and mail have long been important to the functioning of civilized societies. With the rise of communications networks and electronic messaging, and particularly, the increased use of computer networks such as the Internet, the volume and importance of email have become very important, perhaps even eclipsing traditional postal services. However, being in a sense merely another form of mail, email has become plagued with problems and limitations that are also found in traditional mail systems. In some cases, problems with traditional mail systems are exacerbated in email and other electronic messaging systems.

One such problem that vexes users of traditional and email alike is the bulk distribution and receipt of unsolicited "junk" mail. General mail systems are by nature freely available to all potential senders of mail, thereby permitting a free flow of information. Consequently, certain senders of information, such as commercial advertisers, political advocates, and fundraisers, find it advantageous to send unsolicited mail in bulk to many addressees, even though the percentage of addressees that will respond to the unsolicited mail, i.e., the "response rate," may be quite low. Generally speaking, the incremental cost of sending unsolicited mail is related to the response rate that the mail sender must achieve to justify the bulk mailing. In traditional mail systems, the incremental cost of mailing has limited unsolicited mail somewhat. Junk mail may be bothersome to those served by traditional postal services, but it is rarely a serious problem. In a sense, postal service junk mail may even benefit postal users, because the postage fees generated by the high-volume mailings contribute to funding the postal system.

However, some email or messaging systems are "freemail" systems in that they are open mail systems in which senders are not charged based on the quantity of mail sent and the incremental cost of sending a message is essentially zero. In a freemail system, there is essentially no economic limit to the volume of unsolicited mail that a sender may find profitable to send. Internet-connected email systems are a primary example of a freemail system. Consequently, junk mail has become a serious problem on many email systems, in many cases threatening to overwhelm entire systems and often causing the closure of individual email accounts. Various automatic filtering methods have been devised for identifying and segregating or deleting unsolicited junk mail, but all of these systems suffer from the disadvantage of requiring substantial system overhead for performing the identification and filtering tasks. Furthermore, such methods are often easily circumvented by those desiring to send junk mail. Because not all unsolicited mail is undesired, filtering systems also prevent the delivery of some desired mail. Accordingly, junk mail remains a serious unresolved problem on email systems.

The deluge of junk mail on email systems has led to another problem. Knowing that many websites will sell their email address as part of an address list, thereby leading to the receipt of undesired junk mail (sometimes called "spam"), users may provide separate, essentially unused email addresses when registering at commercial sites, or in the alternative, avoid registering any address with websites at all. Such practices may prevent the user from receiving unsolicited mail, but also prevent much desirable electronic communication, and may cause a decrease in desirable electronic commerce. For example, a user may provide an unused email address to his phone company, out of fear that the phone company will sell the address to others, and then fail to read an urgent message from the phone company warning of a shut-off of service for lack of payment. For further example, a user may decide to not visit a website because an email address is required to access certain content, and then fail to discover that the website has interesting content, or offers other valuable products, that the user would have been willing to pay for. Thus, these examples illustrate how concerns over unsolicited email may indirectly hinder electronic commerce and the use of email systems for important communications.

Another problem common to both traditional and electronic messages services is sorting of mail based upon the category of the sender. Mail addressees of both types of services have to sort their own mail. For example, a common secretarial task is to separate junk mail from important business correspondence. It would be much more convenient for addressees if mail were delivered in bundles sorted according to category of sender, for example "commercial mail from known accounts," "mail from XYZ Corp," "mail from friends," "mail from family," "mail from unknown senders," and so forth. Not only would such sorting save the addressee time, such sorting, if carefully executed, might effectively eliminate junk mail from the mail system. Of course, motivating a traditional postal service to sort mail in this way is not a trivial task. Email systems generally do sort mail, on the other hand, but either use sorting methods of relatively small benefit (for example, by alphabetizing mail by sender name), or are subject to the limitations and problems associated with the prior art email filtering systems described above.

Therefore, a mail system that overcomes these limitations and problems of prior art systems is desired. It is further desired that the mail system be readily adapted for use with email systems in use on wide area networks such as the Internet, and similar electronic messaging systems.

SUMMARY OF THE INVENTION

The present invention provides an innovative addressee-defined mail addressing system that overcomes the limitations of prior art email routing and filtering systems. In particular, the system elegantly resolves the problem of unsolicited junk mail while providing mail addressees with a convenient way to organize and sort their mail. The system may be readily adapted for use with existing mail systems, and particularly with email systems commonly used on or connected to the Internet, while requiring minimal system overhead. When implemented according to one of the preferred embodiments, the system is difficult or impossible for senders of bulk unsolicited mail to circumvent. The system will be particularly appreciated by discriminating, knowledgeable users of the Internet, and it is believed that the system will encourage such users to rely more heavily on email as a critical method of communication, and to more freely engage in electronic commerce transactions without reservation.

In general, the addressee-defined addressing system comprises a plurality of addresses and a way to deliver mail according to information in an address associated with each piece of mail. Each address of the plurality of addresses contains a unique delivery address that is sufficient to uniquely identify an individual addressee. As used herein, "addressee" means any entity with the primary right to receive the contents of mail messages delivered to a uniquely identified delivery destination, and is not necessarily limited to individual persons (although in many cases the addressee is an individual person). Therefore, addressees do not include forwarding agents, mail servers, post offices, and other intermediate destinations along a mail route.

According to the invention, each address of the plurality of addresses may optionally contain a delivery code that is distinct from the unique delivery address. A delivery method operates as follows. Any piece of mail not addressed with a fully qualified address portion is processed as not addressed to an identifiable addressee. For example, the mail may be returned to the sender. Any piece of mail addressed with a unique delivery address but not containing a delivery code is also dispatched, preferably as directed by the addressee. For example, the mail may be dispatched by being discarded, by being returned to the sender marked as lacking a delivery code, or by being delivered to the addressee marked or classified as lacking a delivery code. Preferably, the addressee may specify a change in the dispatch method at any time.

Any piece of mail addressed with both a unique delivery address and a valid delivery code is delivered to the addressee according to a delivery rule. The delivery code is considered valid if previously defined (i.e., set-up and/or approved) by the addressee, and not later invalidated by the addressee. The delivery rule may consist essentially of simple delivery to the addressee. However, the addressee may preferably specify additional operations, such as sorting or classifying the piece of mail according to the delivery code. Preferably, the addressee may define or invalidate any number of delivery codes, at any time.

In an embodiment of the invention, the addressing system is applied to an email system, as illustrated by the following example. Various email systems and protocols exist, but most share the following general characteristics. A format for addressing each email message and address information is generally specified. The address generally comprises a name identifying the network location of a destination domain, for example, "xyzcorp.com," plus the name of an account, for example, "johndoe," on the destination domain. The destination domain may be serviced by one or more physical servers, or several domains may be served by a single server. In either case, the entire address, such as, continuing the foregoing example, "johndoe@xyzcorp.com," comprises a unique delivery address, and accordingly, only one "johndoe" can be permitted in the domain "xyzcorp" or any other particular domain. Generally, an email account administrator prevents creation of duplicate account names within a particular domain, thus protecting the uniqueness of each account name, so that the account and domain names together can serve as unique delivery addresses. Furthermore, although different email systems may divide account names variously, for example, the accounts "johndoe" and "bob doe" may coexist on the same domain in some systems, according to the prior art each of these dot-divided names identifies a different, unique account. Various email systems may route email in different ways, such as through different mail servers and gateway servers. However, the basic address format of a domain or server name in conjunction with an account name is widespread, although the invention is not limited thereby.

The present invention may be adapted for use with these commonly used address formats. Prior art email addresses may essentially become a unique delivery address or "root address" of the present system by the addition of a delivery code, such as, for example, a dot-divided prefix. For example, "johndoe@xyzcorp.com" may become "sallyg.johndoe.xyzcorp.com," where "sallyg" is the delivery code and the remainder of the address is the root. According to the invention, the mail server will recognize "sallyg" or any other address prefix as belonging to the account "johndoe," and not as a separate addressee account "sallyg.johndoe." In the alternative, the delivery code may be associated with (and separated from) the root address in any other manner, such as by a combination using some other separation character, or by placement on a separate line or in a separate field of the email. Preferably, each email account holder may freely define any number of different delivery codes at any time, for example, "fredm," "companyabc,""phonecompany," and so forth. Any such addressee-defined code will be recognized by the mail delivery system as belonging to the "johndoe" account.

According to an embodiment of the invention, when providing an email address to others in a system according to the invention, each account holder may provide, and usually will provide, a selected delivery code that appears as part of the email address, such as a prefix. Furthermore, the holder's mail server is preferably configured to ensure that the return email address always includes a delivery code, either by prompting the account holder to supply a selected addressee-defined portion, or by supplying a default addressee-defined portion. Therefore, most or all persons desiring to send email to a particular account will possess a root address and at least one delivery code, that may appear, for example, as a prefix to the root address. Such senders may thus be disposed to generally use what appears to be a complete regular email address (including both the root and prefix portions) in addressing mail to the account. For example, most email addresses are not obtained by manual entry or inquiry, but are instead automatically obtained from the return address field of an email message or from entry by a prospective addressee in a database, such as during a user registration process. Thus, whatever form of address is provided will subsequently be used for addressing mail to the account.

When mail addressed to a particular account as described above is dispatched by a mail server configured according to the invention, the mail is handled differently according to the prefix portion of the address. In an embodiment of the invention, the mail may be sorted into separate folders labeled according to the addressee-defined delivery code. For example, mail addressed to "sallyg.johndoe@xyzcorp.com" may be placed into a folder labeled "sallyg" in the "johndoe" account holder's email directory.

Mail that lacks a addressee-defined prefix portion, or contains an obsolete, incorrect, or otherwise invalid prefix, may be deleted, or placed in a separate folder with a label indicating that no valid address prefix was provided. Such disposition is preferably as directed by the addressee. It may additionally be preferable for the mail server to automatically send a reply message to the sender of such mail. The automatic reply message may identify the addressing error (lack of a prefix or invalid prefix), and notify the sender that the message will not be delivered to the account, or will be placed into a suspense folder.

When reviewing email, the account user (addressee) preferably may view a directory of prefix folders, with the folders containing new or unread mail preferably flagged or highlighted. The user is then free to review mail in any folders of interest, to ignore other folders, or to otherwise prioritize the viewing of mail based on its organization within the folders. Thus, the addressee-defined email address system may operate as the key to a mail organizing system, and each address prefix additionally may operate as a kind of password for obtaining the addressee's attention.

Further beneficial uses of the present addressing system are illustrated by the following examples. One use of the system is for identifying entities that have distributed an email address for purposes of sending unsolicited junk mail, and in addition, the specific receiving entities that a particular distributing entity has sold or transferred the address to. For example, a user may supply the email address "phoneco@johndoe@xyzcorp.com" to the user's phone company. If the user subsequently receives unsolicited, undesired mail from the phone company, and especially from other companies or entities, which is addressed using the "phoneco" prefix, the user knows that the address was obtained from the phone company. The user may then take appropriate action, such as complaining, requesting that the address be kept private, terminating the relationship with the phone company, or even, where permitted by law, filing suit against the phone company. The user may also delete or make obsolete the "phoneco" prefix, so that no further mail addressed using this prefix will be delivered. If the original phone company recognizes that the prefix/root address structure may make its use of the address traceable, it may be more likely to keep the address private. Thus, once the invention is implemented and its functional features are widely recognized, the present invention is anticipated to generally deter inappropriate sharing and use of email addresses for sending unsolicited mail by serving to identify the party responsible for distribution of an email address.

The invention also enables email users to conveniently and quickly eliminate and set up mail folders for purposes such as managing unsolicited mail. For example, if a particular folder receives too much unsolicited or otherwise undesired mail, the addressee may simply delete the corresponding address prefix. Any subsequent mail addressed with the deleted prefix is then dispatched by the mail system as directed by the addressee. The user may quickly replace the prefix with an alternative prefix to receive desired mail in the same category.

Bulk senders of unsolicited mail, sometimes called "spammers" in email parlance, will find it difficult to circumvent the system. Circumvention requires knowing or guessing at least one valid delivery code for every unique delivery address to be spammed. While a spammer may employ a robotic mail agent programmed to generate addresses containing prefixes of commonly used words, such a strategy will only be successful if most addressees use prefixes that are easily guessed, perhaps such as "friends." However, it is anticipated that such guessing strategies may be easily frustrated by choosing less easily guessed prefixes, perhaps such as "4mypals!".

Although the primary applications of the invention are anticipated to be to public freemail systems, such as Internet-connected email systems, the invention is not limited thereby. To the contrary, the innovative concepts of the invention may be applied to a wide variety of mail systems, even, for example, traditional postal services. A hypothetical implementation in a postal service is illustrated as follows: a mail addressee at a fully qualified postal address, such as an individual at a street address, may supply delivery codes to different entities, such as, for example, "Company X," "My Friend Fred," and so forth, with instructions to include the code in the address of all mail to the addressee. The mail addressee would then set out separate mailboxes at the street address, each labeled with a corresponding delivery code. The postal carrier would be required to sort mail delivered to the addressee's street address according to the delivery codes, and place coded mail in the correspondingly-labeled box. Uncoded or improperly coded mail would either be placed in a separate general mail box provided by the addressee for this purpose, or if the addressee provided no general mail box, returned to the sender. The postal addressee would thus have total control over which mail is received, based on the mail sender, without any need for the addressee to review the mail. For example, if the addressee no longer wished to receive mail from Company X, the addressee would simply remove the corresponding Company X mailbox; if the addressee only wished to receive junk mail on Wednesdays, the addressee would only set out the general mail box on Wednesdays; and so forth. The foregoing example is not meant to suggest that implementation in a traditional postal service would be particularly practical, or as beneficial as application to an email system. However, the hypothetical example does serve to illustrate the potentially wide applicability of the pioneering concepts described herein.

A more complete understanding of the addressee-defined mail addressing system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for addressing and delivering mail that overcomes the limitations of prior art mail systems. In the detailed description that follows, like element numerals are used to indicate like elements that appear in one or more of the figures.

Figure 1:
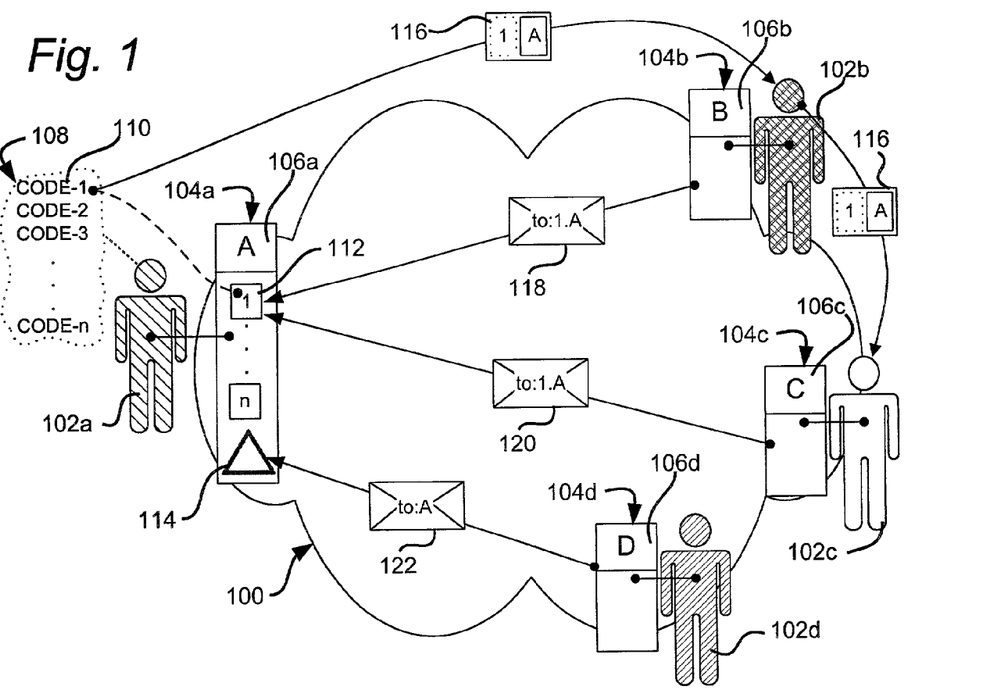
FIG. 1 is a schematic diagram showing elements and operation of a mail addressing and delivery system according to the invention.

Referring to FIG. 1, a mail system 100 comprises a plurality of mail boxes, such as mail boxes 104*a-d* for receiving mail, and a method for sending, receiving, and performing other operations upon mail exchanged between mailboxes. Various methods and/or systems may be used for handling of mail, such as, for example, a network of computers employing at least one mail server in connection with a plurality of client computers; a physical letter-carrying system; or a communications network comprising a transmission medium (such as fiber optics lines, wire, satellites, or radio cells), switches and a plurality of communication devices (such as telephones and/or facsimile machines) capable of sending, receiving, and storing messages. The present system and method may be implemented in any of such various systems by a technician of ordinary skill in the relevant art. Implementation in a mail server of a computer network is believed to be a particularly useful application of the invention.

Each of mailboxes 104a-d (four of many shown) belongs to a corresponding addressee 102a-d with one of the corresponding delivery addresses 106a-d. Each of the addresses 106a-d should be considered primarily a system attribute, because each address is unique within system 100, although addressees may have a limited power to determine their address. Such is illustrated by the example of networked mail servers, each of which is provided with a unique network address through a registry system. Each server then may maintain a separate registry of unique account names. Each account name plus a mail server address comprises a fully qualified address for identifying a particular addressee (or in the case of joint addressees, a particular group) according to a mail sender's delivery intentions. Whether or not there is more than one person or other user at a particular address, each system address (e.g., each of addresses 106a-d) nonetheless designates a sender's delivery intent. For example, mail addressed to the "Doe Family" may be received by, and only by, any member of the family; and thus the family Doe is the addressee. Furthermore, it is well known that mail addresses may be subdivided in various ways, for example, by adding apartment, suite, or box numbers, or in the case of email addresses, by lengthening a root name such as "doe" by adding additional characters such as "john" or "sue." However, such subdivision is performed to enable senders to direct mail to a particular person or persons. Accordingly, such subdivided addresses are merely another form of unique delivery address, and are primarily a system-controlled attribute.

At least one addressee of system 100, for example, addressee 102a, may devise any number of delivery codes 108. For each delivery code, such as a first code 110, the addressee may establish a box, folder, or other suitable partition for organizing mail in mailbox 104a. For example, in an email system, the first code may be a string of characters such as "4mypals" and the folder 112 may be a correspondingly labeled directory folder of the addressee's mail directory. Mailboxes may also have other organizing partitions, for example, the "general inbox" folder 114 of mailbox 104a. In an email system, a particular addressee's delivery codes, such as codes 108, may be maintained in a list or other database on the addressee's mail server or client device. However, the delivery codes belonging to a particular addressee are controlled and maintained at the direction of the addressee, and not a system administrator. The delivery codes are also maintained as confidential to the addressee, meaning that the addressee alone is permitted to divulge them to others. Being comprised of a string of characters, each delivery code may be combined with a root delivery address of an email system, making the combined address appear as a subdivided address. For example, "4mypals" may be combined with "johndoe@xyzcorp.com" to appear like the subdivided address "4mypals.johndoe@xyzcorp.com."

Operation of system 100 is illustrated by the following example. Addressee 102a, for example, "John," divulges delivery code 110 in a combined address 116 provided to addressee 102b, for example, the "PhoneCo." PhoneCo subsequently sends a piece of mail 118 addressed with the combined address 116, which is delivered to mailbox 104a belonging to John and placed in the folder 112 corresponding to the delivery code 110. John, upon reviewing the contents of mailbox 104a, sees the mail from PhoneCo in folder 112 and assumes it to be a phone bill. PhoneCo improperly divulges the delivery code 110 in combined address 116 provided to a third addressee 102, for example, "SalesCo." SalesCo sends a sales solicitation letter 120 addressed with the combined address 116, which is delivered to mailbox 104a and placed in folder 112. John sees the mail from SalesCo in the PhoneCo folder 112 and assumes it to be unsolicited junk mail. John also realizes that SalesCo could have gotten the delivery code 110 only from PhoneCo, because John had not disclosed it to anyone else. John therefore may, if desired, send a message to PhoneCo to complain about their improper disclosure of the combined address 116. Meanwhile, a fourth addressee 102d, for example, "CluelessCo," obtains John's public root email address, and sends a sales solicitation letter 122 addressed only with the root delivery address 106a. In an embodiment of the invention, this mail is delivered to John's general inbox 114, where it sits unread because John receives a huge volume of junk mail and seldom any important mail in the general inbox 114, so this folder is seldom checked unless John somehow learns that someone sent him important mail addressed without a delivery code. After sitting unread in folder 114 for a period of time, the message 122 is discarded. The same result may be obtained if a letter is delivered to a mailbox with an invalid code, such as if CluelessCo attempts to guess at a valid delivery code (but fails to guess correctly), or uses an obsolete code. In the alternative, the message may be "bounced" from John's mailbox by returning to the sender, optionally accompanied by a message stating a reason for the return. Or, some combination of bouncing the message and placing in a junk mail folder may be employed.

Figure 2:
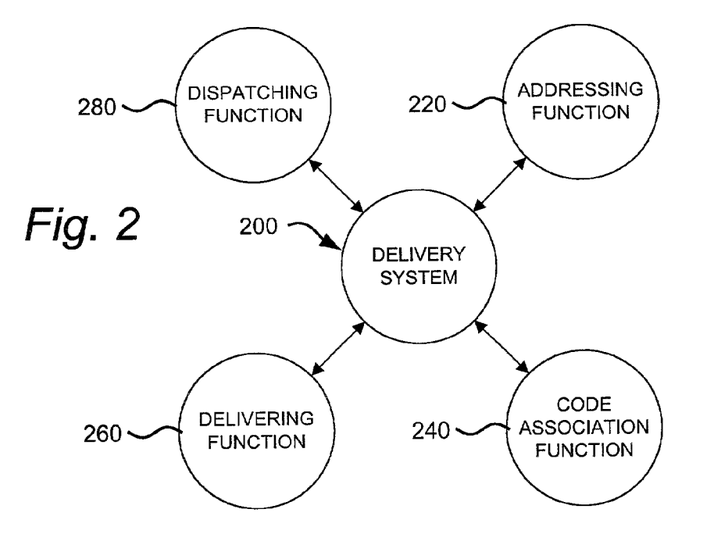
FIG. 2 is a block diagram showing core elements of a mail addressing and delivery system according to the invention.

FIG. 2 shows a block diagram of a delivery system 200 according to the invention. Delivery system 200 comprises four primary elements: addressing function 220, code association function 240, delivering function 260, and dispatching function 280. These functional elements are not necessarily performed by distinct apparatus or in separate steps, but rather represent key functional aspects of the present invention. The addressing function 220 accomplishes the addressing of messages according to defined rules. For example, the defined rules may comprise postal service addressing regulations, and the method of addressing may comprise writing the address on the exterior of a letter. In an email system, various rule systems are known for addressing messages, for example, Simple Mail Transport Protocol (SMTP). The method of addressing may comprise inserting the address into the appropriate location in a file, and is normally performed by an application operating in a computer. The addressing function may comprise steps performed at different system levels, for example, by a client using a web browser or mail interface program, by an outgoing mail server, or by a gateway server to a different network.

Code association function 240 accomplishes association of delivery codes with root delivery addresses. Like addressing, consistent rules for such association are needed. Such rules may be considered part of addressing rules, but are mentioned here separately to highlight the importance of the addressing scheme of system 200 being compatible and associable with the delivery codes. For example, in an email system delivery codes may be incorporated as prefixes to root addresses, separated by a character such as a dot. In the alternative, delivery codes may appear in a separate address field or line. However, a prefix format is believed preferable for compatibility with existing email addressing protocols. Association using a prefix structure provides the advantage of allowing the combined address to be handled by system 200 as though it were a subdivided, regular address.

Delivering function 260 accomplishes routing and delivery of an addressed message bearing a full address (including a valid delivery code) to a designated location in an addressee mailbox. Again, various methods and systems are known for delivery of a message according to address information. One skilled in the art may adapt such methods to incorporate the functional aspects of the present invention. In particular, such methods should be adapted to ignore the delivery codes of the invention except at the point of delivery to an applicant mailbox. Additionally, the delivery function should include checking the validity of delivery codes against a list of valid codes maintained by a particular addressee, and organizing the delivered mail according to the addressee's delivery codes. For example, in an email system using a SMTP-like protocol, any dot-divided prefixes would be essentially ignored until the message reached the destination mail server. Then, the destination mail server would obtain the delivery code list belonging to the root address, determine whether the message address contained a valid delivery code, and if so, place the message in the addressee's inbox folder in a subdirectory (folder) belonging to the corresponding delivery code.

Dispatching function 280 parallels the delivery function, but is for disposition of mail that lacks a valid delivery code. Function 280 may operate essentially the same as delivery function 260, except after the mail has been delivered to the root address. Thus, in an email system, the novel aspects of the dispatch function 280, like the other novel aspects of system 200, may be performed primarily or even entirely on a mail server at the root domain. It is anticipated that the ability to perform the novel aspects of the invention on a server at the root domain makes the invention highly compatible with existing email systems. In addition, the invention may be implemented modularly, that is, mail servers that operate according to the invention will be compatible with, and may operate as part of, a mail system that also includes mail servers not configured according to the invention. After delivery to the addressee's mail server or other local delivery agent, the dispatching function obtains the addressee's dispatching rule (e.g., "discard message," "place in general invalid code folder," "return to sender," "inform sender," or some combination of the foregoing) and dispatches the message accordingly. Thus, in an embodiment of the invention, a result of the operation of the dispatching function may be very similar to (except for the label of the delivery folder) to that of the delivering function. However, even this slight difference may provide the addressee with the benefits of the invention, in that once the messages lacking valid codes are segregated, the addressee may conveniently ignore them. Additionally, the dispatching rule may vary according to the circumstances. For example, if the delivery code used by the sender was once a valid code, but has been changed, a message to this effect may be returned to the sender. In comparison, if the sender has not provided any delivery code, or has used an unrecognized code, a different message may be returned to the sender.

In general, as part of the dispatching rule 280, it is preferable to perform at least one of returning the original message or returning a notice of invalid code to the sender, thereby ensuring that the sender does not falsely assume that the message was delivered normally. Desired correspondents, upon receipt of a returned message and/or notice, will generally have some other way (such as a phone call) of contacting the addressee and thus obtaining a valid delivery code. Undesired correspondents will be unable to obtain a valid delivery code, and will be made aware that their unsolicited mailing was ineffective. The additional actions of retaining a copy of the message in a separate folder or other location (or marked to indicate an invalid delivery code) may be combined in various ways with other actions, preferably at the option of the addressee.

Figure 3:
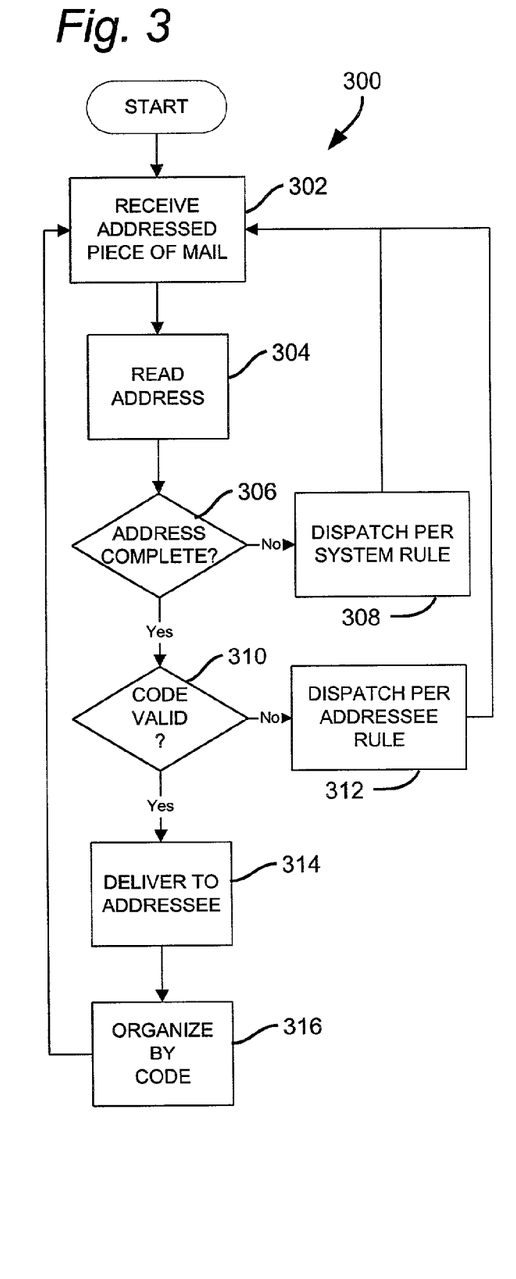
FIG. 3 is a flow chart showing exemplary steps of a method for delivering mail according to the invention.

FIG. 3 shows exemplary steps of a method 300 for delivering mail according to the invention. In an initial step 302, a piece of mail bearing an address is received. Various methods may be used to send the piece. For example, a sender may place an article of mail in a mailbox for pick-up, such as the outgoing mailbox of a mail server, by selecting a "send" command in an email application. The addressee address (or addresses, if there is more than one addressee) is read at step 304. At step 306, the completeness of the address is determined. Portions of step 306 may be performed at different points in a mail system. For example, a first email server may determine that the destination domain, such as "xyzcorp.com" exists and is available to receive mail. A second email server at the destination domain would then determine whether the addressee name, such as "johndoe," is a valid account on the mail server. Failure of either condition will cause the message to be dispatched at step 308 according to a system rule for dispatching improperly addressed mail. For example, the mail system may return the piece of mail to the sender with an error message.

At step 310, if the address meets the minimum criteria for completeness, the piece of mail is checked for the presence of a valid delivery code. This step will typically occur at the destination side of the mail route, such as by a destination mail server or post office. The delivery code is first identified, such as by reading an address prefix or scanning a field set aside for delivery codes. Preferably, only one delivery code per message and per addressee is recognized. This preferable limitation does not conflict with another preferred aspect of the invention: that delivery codes may be subdivided to facilitate a hierarchical organization scheme, such as a directory structure. Any delivery codes that are recognized as associated with the mail message (preferably, a maximum of one) are then compared against a list of valid delivery codes from an addressee-supplied list. The list of valid codes may be obtained in various ways, for example, by querying a database maintained for this purpose, or by examining an addressee mailbox and reading its folder labels. If a match is discovered, the code is validated. If no match is discovered, the message is dispatched according to an addressee-supplied rule, which may be supplied like the list of valid delivery codes. As previously described, typical dispatch rules may include "return to sender," "send error message to sender," "discard," and/or "segregate in a folder."

If the message bears a valid delivery code, it is delivered to the addressee at step 314 according to a delivery method as known in the art. Preferably, the piece of mail is placed into an addressee mailbox organized by code at step 316. Of course, organization may be accomplished in a computer system by merely displaying a list of messages sorted by delivery code. Some users may prefer to have messages placed in an appropriate folder of a directory as determined by the delivery code. The particular folder and/or directory tree may then be highlighted and/or flagged to indicate the presence of a new, unread piece of mail. Other users may prefer that all the messages, or in the alternative, all of the messages having valid delivery codes, be placed in a single folder, organized in a list format such as in reverse chronological order. In a list format, the delivery code used by each message may optionally be listed or otherwise indicated (such as by an icon) on or adjacent to each item in the list. The user may then quickly scan all of the messages received to identify those of highest interest. Additionally, some users may desire to archive some or all of the messages in selected folders, after having reviewed them. Preferably, the user may specify the desired mode of presentation and/or archiving, and toggle between different presentation modes at will.

In an embodiment of the invention, delivery codes may facilitate hierarchical organization of messages. For example, a message having a subdivided delivery code consisting of "ted&sal.4mypals" may be placed in a "ted&sal" folder of a "4mypals"directory. Method 300 may then be repeated in order for the next piece of mail received. Because delivery codes are preferably addressee-controlled, and may be used to primarily indicate a sender or category of senders, the invention thus provides for the organization of mail by category of sender. Additionally, the mail messages may be organized by other principles, such as in alphabetical order by the sender's subject line or in chronological order, as known in the art.

Figure 4:
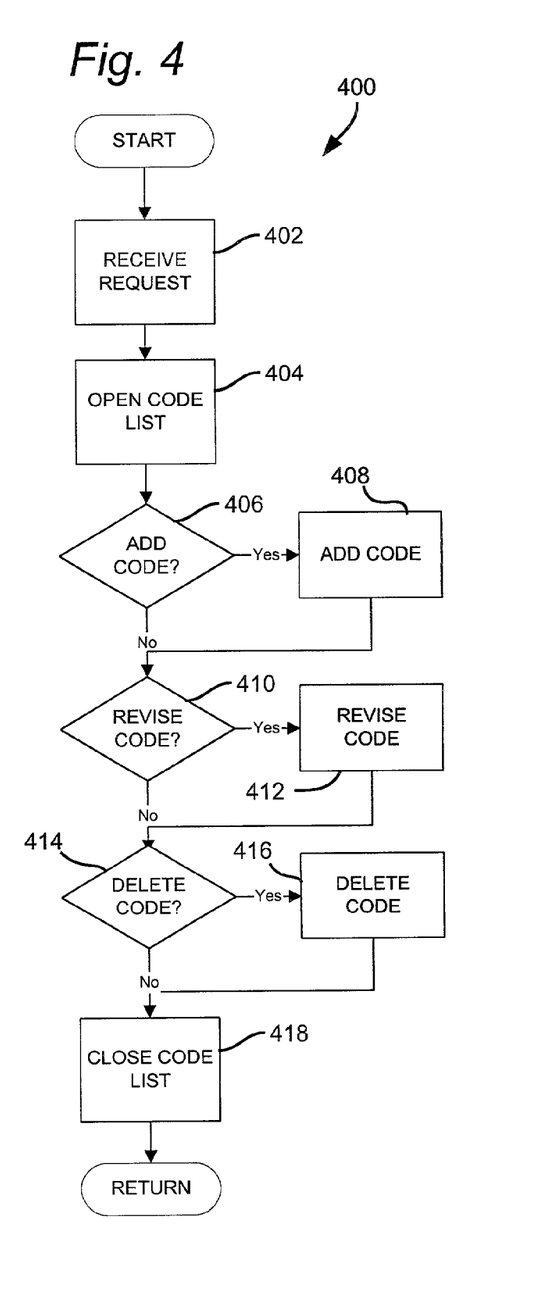
FIG. 4 is a flow chart showing exemplary steps of a method for providing an addressee an option to define and revise delivery codes according to the invention.

FIG. 4 shows exemplary steps of a method 400 for providing an addressee an option to define and revise delivery codes according to the invention. Providing addressee control over delivery codes is an important aspect of the invention. Method 400 is intended to operate in a system where a mail server or other delivery component of the system maintains a list or database of valid codes for at least some addressees. Accordingly, the method requires a preparatory step (not shown) of preparing the lists or database, and providing procedures for its operation. At step 402, an addressee request is received by the agent, such as an application operating on a mail server, responsible for maintaining the addressee database of delivery codes. In an embodiment of the invention, a user interface of an email system provides a function for administering the user's delivery codes. The user would issue the request referred to by opening the administrative function and selecting an appropriate command. After the request is received, the requestor's list of established delivery codes is opened, such as by retrieving the list in a computer memory or connecting to a database, as known in the art.

Three typical requests that may preferably be accommodated include adding, revising, or deleting a specified delivery code. If, at step 406, it is determined that the request is to add a code, the requested code is added to the list at step 408. This may be done by providing an appropriate data field for the user to enter the desired new delivery code. The requested new code is preferably validated by comparing with the addressee's other established delivery codes, to ensure that it is not a duplicate of an established code. Additionally, the requested new code may be checked for the presence of characters or character strings that are forbidden or discouraged by the mail delivery system, such as special characters reserved for system use, and for proper syntax. If errors are discovered, the system preferably prompts the user to supply a different code. The system may provide a mailbox folder labeled with the new delivery code after the code has been thus established.

When setting up a new delivery code, the user preferably may be given the option of characterizing the delivery code by associating related information. For example, the date and time that the delivery code is established may be recorded in a database of delivery codes. The user may, in addition, desire to record the identity of other parties to whom the address is given to so as to better keep track of its use, and/or to make a note of any explanatory comments. These and similar information may readily be recorded in a database at the time a delivery code is added. A database of delivery codes may be especially useful for managing the delivery codes and ensuring that a particular correspondent is not provided with more than one delivery code. For example, the return address field (or other field of a message designated for providing delivery codes) may be checked when every message is sent by a user. Any delivery code found may be looked up in the database and compared with the recipient's name and address. If the recipient and the delivery code do not match, the user may be alerted to the discrepancy, or in the alternative, the discrepancy may be repaired automatically by replacing the delivery code with the valid code previously provided to the recipient. Similarly, if the message sent lacks a delivery code, the database may supply the delivery code found in the database for the indicated message recipient, or alert the user if the recipient is not found.

In an embodiment of the invention, new delivery codes may be generated automatically or semi-automatically. Automatic generation of delivery codes may be particularly useful, for example, in corresponding with others from whom a very small volume of return mail, such as a single piece, is anticipated. Addressees may not desire to take the time to develop a customized delivery code for such correspondents, but at the same time, may want to ensure that any return correspondence is not lost in a junk mail folder, or other generic mail folder. Automatic generation of codes may be triggered by a specific, defined action performed by a user, such as, for example, sending a mail message with no delivery code in the return address field, or pressing a "generate delivery code" button at some time during the process of composing or sending a message. When the addressee performs the defined action, a mail browser or similar application may generate the code automatically, and insert the automatically-generated code in the return address or other appropriate message field.

Various methods may be used to generate a code automatically. For example, the recipients name or a defined number of characters thereof may be combined with a specified number of random characters and/or a randomly selected word. Such an automatic method may generate, for example, a delivery code of "janed8g7puff" for a recipient named "janedoe." Preferably, the automatically generated code is then saved in a database in association with the recipients name and mail address, like delivery codes generated manually.

If, at step 410, a request to revise a code and/or any associated information is detected, the code or associated information is revised at step 412. One way to provide for revision is to present the user with a selection list of available codes. The user is permitted to select a code from the list, for example, by "clicking" on a code in a drop-down list. The established code and any associated information then appears in an appropriate revision box of a revision window, where the user may alter the desired characters. When finished, the user signals completion of the editing process, such as by pressing a "done"button. The revised code is then validated and established as described above. Revising a code achieves the same result as deleting a code and adding a different code, although the sequence of steps followed in a revision process may be more convenient for users in some situations.

Similarly, if a request for deletion of a code is detected at step 414, the requested code is deleted at step 416. Users may desire to delete codes when a particular folder begins to receive too much undesired mail. In effect, deleting a code is like deleting one of a user's email accounts, but is preferably more convenient than deleting an account. A process for deleting a code may begin much like the process described above for code revision, i.e., presenting a user with a selection list. The selected code may then be deleted by removing it from a list of valid codes. In an embodiment of the invention, the removed code and any associated information are retained in a list or database of obsolete codes. After a code has been deleted, the user preferably has the option of deleting any established mailbox folder labeled with the deleted code, or in the alternative, retaining the folder for archival purposes. The list or database of delivery codes is then closed, completing the exemplary code-defining method 400.

When a code is deleted or revised, it may be desirable to inform selected correspondents of the change. Various methods may be used to inform selected correspondents, such as by informing them manually. However, it may be preferable for a mail system to include a function for automatically informing correspondents of a user of a change or removal of a delivery code. The database of delivery codes may be used for this purpose, in conjunction with a delivery code manager function. When a code is deleted or changed, the manager function may consult the database to obtain the names and addresses of all correspondents listed in association with the prior delivery code. A message may then be automatically generated and/or sent to the correspondents, informing them of the change. Optionally, the manager function may prompt the user to approve the sending of the notices, to ensure that undesired correspondents are not alerted to the change. When the correspondents to be noticed are served by the same mail server (or other system of equivalent capability) as the user, it may be further preferable to include a function for automatically updating the address books of the correspondents. For example, when a change in delivery codes is made, the manager function may cause a "pop-up" message to be delivered to the associated correspondents on the server. The message may provide a button or similar device for the recipient to activate, such as by clicking on with a pointing device, thereby causing the manager function to automatically update the recipient's address book with the new delivery code information.

Figure 5:
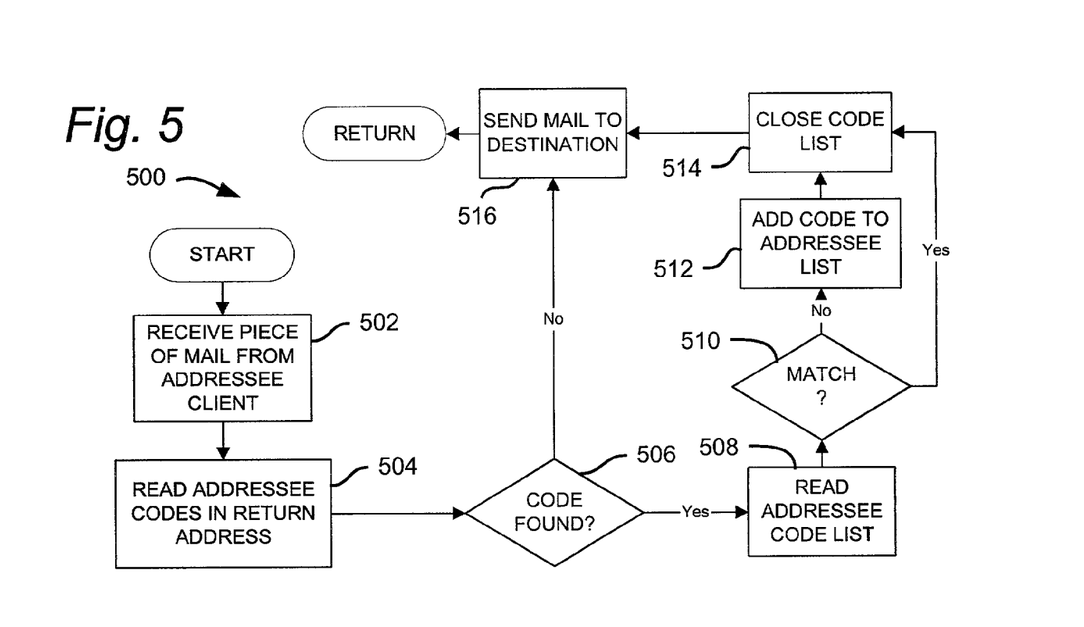
FIG. 5 is a flow chart showing exemplary steps of an alternative method for providing an addressee and option to define delivery codes semi-automatically.

FIG. 5 shows exemplary steps of an alternative method 500 for providing an addressee an option to define delivery codes semi-automatically. Method 500 is intended to provide for setting up codes "on the fly" in a return address field accessible at the sending end of a mail transaction. For example, in an email system, the return address field (or other field designated to contain delivery codes) should be visible and accessible in a message composition screen of the user's email program, like an addressee or "cc:"field. In an email system, the return address field may be especially suitable for containing prefixed delivery codes, for compatibility with existing email systems. Such prefixed codes will be treated by existing mail systems as part of the account name. However, at an addressee mail server configured according to the invention, the prefixes will be recognized as delivery codes. The return address field may have the user's root address as its default value, with established delivery codes easily selectable, such as by selection from a drop-down list. Method 500 may then operate to provide the user with an option to set up a new delivery code by typing the new delivery code in the return address field. The method may be readily adapted to function with separate delivery code fields as well.

Method 500 may then operate by scanning the return address field of sent mail, as exemplified by the following steps. At step 502, a piece of mail is received from an addressee client who has submitted the mail message for delivery to another addressee of the system. At step 540, the return address field (or other separate field for delivery codes) is read. If no delivery codes are found at step 506, the mail is sent to its destination at step 516. If a code is found, the sender's delivery codes are accessed at step 508. If a match is found at step 510 between the delivery code on the piece of mail and a code in the sender's list of established codes, the database or list of delivery codes is closed at step 516 and the mail is delivered to its destination at step 516. Optionally, the delivery code may be checked for consistency with the past delivery code provided to the designated mail recipient, and the sender may be alerted to any discrepancy. If no match is found, the delivery code identified on the piece of mail is added to the sender's list of delivery codes. Optionally, the sender may be prompted to confirm or cancel the addition of the new code, and/or be prompted to supply any desired associated information. The code and any associated information are then added to the list at step 512, the list is closed at step 514, and the mail is delivered at step 516. Thus, the user may be given the option of establishing new delivery codes automatically upon the occurrence of certain events, such as at the time of composing or sending a mail message.

Figure 6:
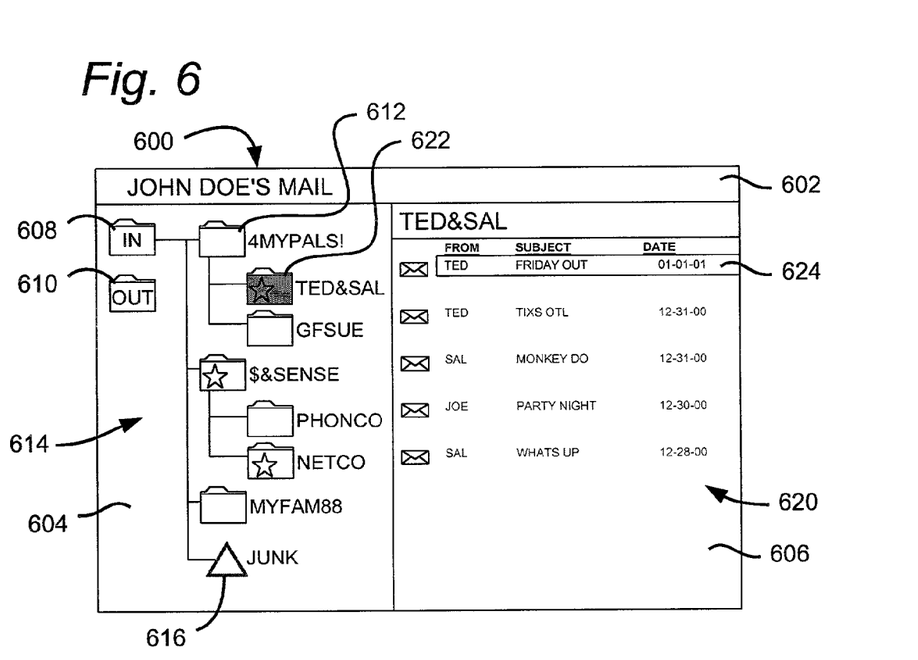
FIG. 6 is a schematic diagram of an exemplary view screen for use with a system and method according to the invention.

FIG. 6 shows an exemplary view screen 600 for use with a system and method according to the invention. The view screen is configured for use with an email application running on a client (addressee) computer of an email system. Screen 600 comprises a title frame 602, a directory frame 604, and a message list frame 606. Additionally, a frame for message contents (not shown) may be provided. Directory frame 604 may display a plurality of folders, such as inbox folder 608 and outbox 610. The folders are preferably organized into a directory structure 614. Lower-level folders within a particular folder or directory preferably may be displayed or hidden at the users option. In FIG. 6, the folders in the inbox 608 are displayed. These folders may be labeled with delivery codes, such as folder 612 labeled with "4MYPALS." A separate folder, such as the "JUNK" folder 616, may be established for mail received without a valid delivery code. Folders containing new unread mail may be flagged, such as with an icon 618.

Although FIG. 6 shows a plurality of hierarchical folders organized according to delivery code, users are preferably provided with an option to view received messages in a list format, such as in reverse chronological order, irrespective of the delivery code. It may still be preferable to segregate mail lacking a valid delivery code from mail with a valid delivery code on the list. The delivery code may optionally be indicated, such as by an icon or spelled out, on or adjacent to each line item of the list. The list format provides the advantage of allowing the user to quickly scan all received messages to identify the most urgent or most interesting messages. Accordingly, it may be preferably to provide users an option to toggle between a combined list view and a directory view as shown in the directory frame 604. For example, a toggle button (not shown) may be provided. Alternatively, the directory frame 604 may be configured so that all files contained in a root folder and any subdirectories are listed together when a root folder is highlighted. Less preferably, the directory view may be omitted altogether.

In an embodiment of the invention, a user may view a list of messages 620 within any given folder by selecting the desired folder. For example, in FIG. 6, the "TED&SAL"folder is highlighted, and the list of messages 620 in this folder is displayed in the message list frame 606. The list may be displayed in any suitable format. For example, the list may display selected message fields such as the identity of the sender, a subject line, and message date. The contents of any message may preferably be viewed by selecting a message from the list, for example, message 624 (shown highlighted). Thus, the example illustrates how a method and system of the present invention may be readily implemented in an email system using a mail interface like those currently preferred by many computer users. Of course, a wide variety of other user interfaces may be designed and used with the present invention, without departing from the scope thereof.

Having thus described a preferred embodiment of a addressee-defined mail addressing system, it should be apparent to those skilled in the art that certain advantages of the within system have been achieved. It should also be appreciated that various modifications, adaptations, and alternative embodiments thereof may be made within the scope and spirit of the present invention. For example, a addressee-defined mail addressing system for use on an email system has been illustrated, but it should be apparent that the inventive concepts described above would be equally applicable to any mail system. The invention is further defined by the following claims.

What is claimed is:

1. A method for disposition of mail comprised of a plurality of pieces, the method comprising the steps of:

reading an address associated with a piece of the plurality of pieces, wherein the address comprises a root delivery address of an addressee for the piece and a delivery code defined by the addressee;

providing the delivery code in a return-address field of outgoing mail as distinct from and prefixed to the root delivery address so that the delivery code appears as a dot-separated prefix to the root delivery address in a subdivided SMTP address necessary for specifying an electronic mail account;

determining whether the address comprises a valid delivery code; and disposing of the piece based on a result of the determining step, wherein the piece is segregated from mail bearing any valid delivery code if the address does not comprise a valid delivery code and the piece is delivered to the addressee if the address comprises a valid delivery code.

2. The method according to claim 1, wherein said reading step further comprises reading the piece of the plurality of pieces comprised of an electronic message delivered over a computer network.

3. The method according to claim 1, wherein said reading step further comprises reading the piece of the plurality of pieces comprised of an email message.

4. The method according to claim 1, further comprising organizing the piece in a directory of received mail according to the delivery code.

5. The method according to claim 1, further comprising providing the addressee with an option to define a plurality of valid delivery codes comprising the delivery code.

6. The method according to claim 5, further comprising providing the addressee with an option to invalidate any of the plurality of valid delivery codes that have been defined by the addressee.

7. The method according to claim 1, further comprising dispatching the plurality of pieces of mail by repeating said reading step, said determining step, and said disposing step in sequence for each of the plurality of pieces of mail.

8. The method according to claim 7, further comprising organizing at least selected ones of the plurality of pieces of mail in a directory according to a plurality of delivery codes defined by the addressee.

9. The method according to claim 1, wherein said disposing step further comprises discarding the piece without delivering to the addressee if the address does not contain the valid delivery code.

10. The method according to claim 1, further comprising automatically notifying a sender of the piece that the piece is not addressed with a valid delivery code defined by the addressee.

11. A system for delivering email messages, the system comprising:

a computer connected to a network and operable to send and receive the email messages to and from the network;

a memory connected to the computer; and an application stored in the memory and operable with the computer to perform functions of:

reading an address associated with a message of the email messages, wherein the address comprises a root delivery address of an individual addressee for the message and a delivery code defined by the addressee;

providing the delivery code in a return-address field of outgoing mail as distinct from and prefixed to the root delivery address so that the delivery code appears as a dot-separated prefix to the root delivery address in a subdivided SMTP address necessary for specifying an electronic mail account;

determining whether the address comprises a valid delivery code; and disposing of the message based on a result of the determining step, wherein the message is segregated from mail bearing any valid delivery code if the address does not comprise a valid delivery code and the message is delivered to the addressee if the address comprises a valid delivery code.

12. The system according to claim 11, wherein the application is further operable to perform the function of reading the piece of the plurality of pieces comprised of an electronic message delivered over a computer network.

13. The system according to claim 11, wherein the application is further operable to perform the function of reading the piece of the plurality of pieces comprised of an email message.

14. The system according to claim 11, wherein the application is further operable to perform a function of organizing the piece in a directory of received mail according to the delivery code.

15. The system according to claim 11, wherein the application is further operable to perform a function of providing the addressee with an option to define a plurality of valid delivery codes comprising the delivery code.

16. The system according to claim 15, wherein the application is further operable to perform the function of providing the addressee with an option to invalidate any of the plurality of valid delivery codes that have been defined by the addressee.

17. The system according to claim 11, wherein the application is further operable to perform the functions of dispatching the plurality of pieces of mail by repeating said reading step, said determining step, and said disposing step in sequence for each of the plurality of pieces of mail.

18. The system according to claim 17, wherein the application is further operable to perform the function of organizing at least selected ones of the plurality of pieces of mail in a directory according to a plurality of delivery codes defined by the addressee.

19. The system according to claim 11, wherein the application is further operable to perform the function of discarding the piece without delivering to the addressee if the address does not contain the valid delivery code.

20. The system according to claim 11, wherein the application is further operable to perform the function of automatically notifying a sender of the piece that the piece is not addressed with a valid delivery code defined by the addressee.

* * * * *